United States Patent Office 3,838,198
Patented Sept. 24, 1974

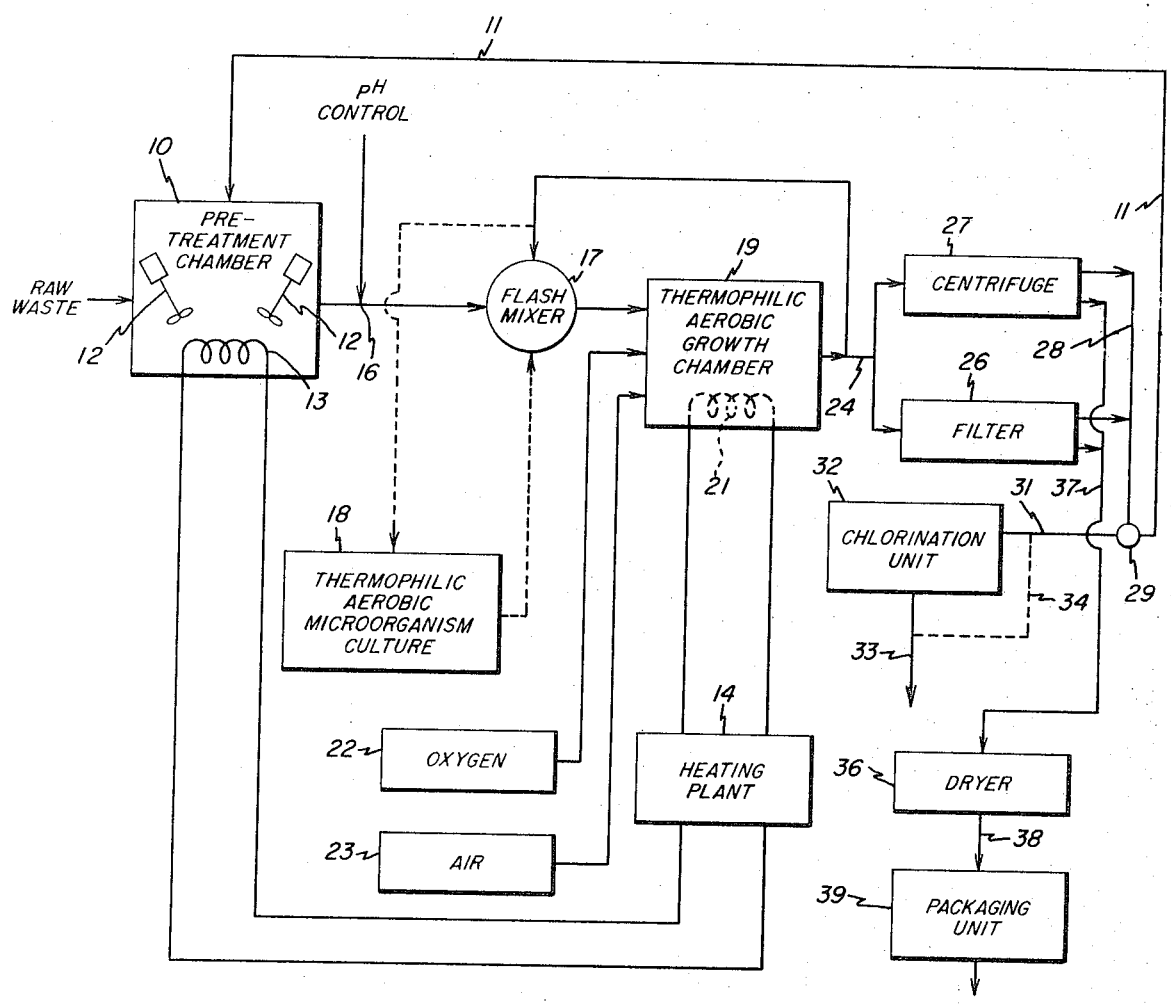

3,838,198
CONDITIONING RAW WASTE INPUT FOR DIGESTION BY THERMOPHILIC AEROBIC MICROORGANISMS
Winthrop D. Bellamy, Schenectady, and Ananda M. Chakrabarty, Latham, N.Y., assignors to General Electric Company
Filed Mar. 1, 1972, Ser. No. 230,668
Int. Cl. A23k 1/00
U.S. Cl. 426—53        6 Claims

ABSTRACT OF THE DISCLOSURE

Animal waste, particularly excrement from ruminants, to be subjected to degradation by thermophilic aerobic microorganisms is subjected to pretreatment in which the raw waste is mixed with waste liquor (from the reacted waste mixture leaving the thermophilic aerobic growth chamber) and is heated to a temperature in the range of from about 75° C. to about 85° C. This pretreatment is of particular advantage when the thermophilic organisms employed for the digestion are productive of soluble (detached) extra-cellular enzymes that will degrade cellulose.

BACKGROUND OF THE INVENTION

Much research and development effort has been, and is now being, expended in the development of processes for the treatment of solid, organic, biodegradable waste materials. In general, these processes have the minimum objective of reducing pollution of the environment and some of these processes are employed to convert these wastes to useful products, e.g. animal feed supplements.

Among the most promising of these developments in waste conversion is the process described in U.S. 3,462,-275—Bellamy (incorporated by reference), wherein thermophilic microorganisms are employed to convert cellulose-containing waste into cellular proteinaceous materials, preferably pasteurized, useful as animal feed supplements and as sources of extractable proteins. The Bellamy invention in addition to having utility in the treatment of industrial wastes and domestic and municipal sewage has particular application to the solution of a serious problem that has developed from present-day trends of feeding dairy and beef cattle, while they are kept in confinement within enclosures. The development of mechanized and specialized large stock feed lot enterprises has created a serious animal waste disposal problem, particularly because of the contamination of surface water with nutrients from these wastes. This problem is reviewed in a study "Pollution Implications of Animal Wastes—A Forward Oriented Review" prepared by Dr. Raymond C. Lochr for the U.S. Department of the Interior (July 1968).

PROBLEM AND SUMMARY OF THE INVENTION

The term "animal waste" as employed herein is the composite of the animal feces, bedding material (e.g. straw) and urine, which has usually soaked into the bedding material.

Such waste matter from ruminants contains bacteriophages (viruses) that inhibit the growth of thermophilic microorganisms. When raw animal wastes are processed according to the process in the Bellamy patent without pretreatment, such as is provided by the instant invention, growth of the thermophilic microorganism culture on these wastes is far short of optimum. It is possible that the presence of viable bacteriophages may be the cause.

Although the reason is not fully understood, it has been found that certain pretreatment of the raw animal wastes greatly improves thermophilic microorganism growth on the waste matter. This pretreatment consists of mixing the raw animal wastes with waste liquor (i.e. supernatant broth separated from the solid, cellular proteinaceous material producing during the treatment of cellulosic-containing wastes by the Bellamy process) and heating the mixture to a temperature in the range of from about 75° C. to about 85° C. for a period of about 1 to 2 days.

BRIEF DESCRIPTION OF THE DRAWING

The exact nature of this invention as well as objects and advantages thereof will be readily apparent from consideration of the following specification relating to the annexed drawing wherein is shown a schematic flow sheet illustrating the application of the instant invention to the Bellamy process.

DESCRIPTION OF THE PREFERRED EMBODIMENT

The instant invention is considered an improvement in the Bellamy process and is of primary interest in the processing of the cellulose-containing animal wastes.

In the practice of the process in the Bellamy patent, after the biodegradable materials have been acted upon by thermophilic microorganisms, the reacted waste mixture from the thermophilic aerobic growth chamber is passed through a filter (or centrifuge) to separate the solid cellular proteinaceous material produced and the supernatant broth or waste liquor. This waste liquor may be discharged, subjected to regular sewage treatment or returned to the growth chamber.

In the practice of the instant invention 50–70 percent by volume of the waste liquor is recirculated to a pretreatment chamber wherein it is mixed with the raw animal waste and the mixture (from about 2 to about 50% by weight solids) is heated to a temperature in the range of from about 75° C. to about 85° C. This conditioning is carried on for a period ranging from less than about 24 hours (at 85° C.) to about 48 hours (at 75° C.). The optimum temperature range is 78°–80° C. In view of the pronounced improvement in thermophilic microorganism growth in the medium it is believed that bacteriophages (and/or other agents) harmful to the thermophilic organisms are inhibited. In addition, this pretreatment provides the capability for controlling the "mix" of microorganisms prevailing in the growth chamber. The temperature of the waste liquor will range from about 50–75° C. and this heat content reduces the energy demand for heating the contents of the pretreatment chamber.

When the culture employed for the waste conversion process contains microorganisms selected from the group consisting of thermophilic fungi and thermophilic actinomyces, e.g. as listed in the Bellamy patent, a very important advantage is obtained in the treatment of biodegradable cellulosic containing waste, such as cattle wastes, for example. Thermophilic fungi and thermophilic actinomyces are characteristic of those organisms, which generate water-soluble (detached) extra-cellular enzymes, which form part of the waste liquor. These enzymes have the capability for degrading cellulose and, when present during the pretreatment, these enzymes greatly increase the effectiveness of digesting cellulose in the waste being processed. This enzyme degradation is optimal in the 75–80° C. range. It has been found that this enzyme activity increases the soluble reducing sugar in the pretreatment chamber by 10–20 fold (as compared to untreated raw animal waste). This enzyme activity plus the mixing and heating operations produces a more homogeneous input to the growth chamber resulting in enhanced growth of the thermophilic, cellulolytic actinomyces.

In the drawing, raw animal waste (by way of example) is introduced into pretreatment chamber 10 as a slurry, or semi-solid. In chamber 10 the raw waste is mixed with waste liquor received via conduit 11 sufficient to produce a mixture containing from about 2% to about 50% by weight of solids. The mixing is accomplished with agitating means 12 and the mixture is heated to a temperature in the range of from about 75° C. to about 85° C. by means, such as heat exchanger 13 in flow communication with the heating plant 14.

Although only one pretreatment chamber 10 is shown in the drawing it may be necessary to employ several such chambers to provide for continuity in the process. After the requisite period of pretreatment ranging from less than 1 day up to about 48 hours, the pretreated waste leaves chamber 10 and is monitored for pH level. The pH is adjusted as required at station 16 to maintain a pH range of from about 5.5 to about 8.5 utilizing suitable chemicals, i.e. hydrochloric acid or sodium hydroxide.

The waste matter is then passed into mixing chamber 17. In the mixing chamber 17, the pretreated wastes and thermophilic aerobic microorganism culture from vessel 18 are violently mixed until a uniform distribution of the culture through the waste matter is obtained.

This mixture is then passed into the thermophilic aerobic growth chamber 19, which contains means 21 for either heating or cooling the growth chamber as required to retain the temperature in the 45–80° C. range. In the structure shown, unit 21 is a heat exchanger in flow communication with heating plant 14.

Oxygen (0.3 to 2.0 mg. per liter of growth chamber content) is supplied to the waste/microorganism mixture either from oxygen source 22 or from air source 23 for a period of time ranging from about 2 to 24 hours.

During this period of oxygenation, the aerobic microorganisms multiply rapidly in the pretreated waste and digest this organic biodegradable material to yield cellular proteinaceous and other cellular materials. A portion of the reacted waste mixture discharged from growth chamber 19 may be returned to mixing chamber 17, to the growth chamber 19 or to culture vessel 18 for the inoculation function.

The reacted waste mixture (other than the recirculated mix) exiting from growth chamber 19 via conduit 24 is conducted to either filter 26 (or centrifuge 28) for separation of the solid cellular proteinaceous material from the waste liquor, or supernatant broth. The waste liquor is conducted via line 28 to a proportioning valve 29 from which point the waste liquor may in part be recirculated to pretreatment chamber 10 via conduit 11 and, in part, removed via conduit 31 to chlorination unit 32 for treatment and disposition via pipe 33. Chlorination unit 32 may, of course, be bypassed via conduit 34, when the waste liquor is in the pasteurized condition (i.e. when growth chamber 19 is operated at temperatures in excess of 55° C.), for discharge directly into lakes or streams providing the nitrogen and phosphorous contents are acceptable.

The solid cellular proteinaceous material from filter 26 and/or centrifuge 27 is passed to drier 36 via conduit 37, where the water content thereof is greatly reduced. The dried cellular material (preferably in the pasteurized condition) is then conveyed via conveyor 38 to the packaging unit 39 for packaging as animal feed supplement material or as a source of extractable protein.

What we claim as new and desire to secure by Letters Patent of the United States is:

1. In the process of treating biodegradable organic waste material containing cellulose wherein in a series of steps the pH of the waste material is adjusted to a level between 5.5 and 8.0; the waste material is mixed with culture containing microorganisms selected from the group consisting of thermophilic fungi and thermophilic actinomyces in a liquid medium; oxygenating gas is introduced into said mixture; said mixture is maintained at a temperature of from 45° C. to 80° C. and cellular proteinaceous material is separated from the waste liquor after the thermophilic aerobic microorganisms have multiplied and grown in said mixture, the improvement comprising the pretreatment steps of:
   (a) mixing the incoming waste material with waste liquor output from said series of steps, and
   (b) heating the waste liquor-impregnated waste material of step (a) for a temperature/time relationship ranging from an exposure at about 85° C. for a period of less than 24 hours that is effective to inhibit agents contained therein harmful to the thermophilic microorganisms to an exposure at about 75° C. for a period of about 48 hours, said mixing and heating occurring before the waste material is subjected to said series of steps.

2. The improvement of claim 1 wherein the heating is to a temperature in the 78–80° C. range.

3. The improvement of claim 1 wherein the waste material is raw animal waste.

4. The improvement of claim 3 wherein the animal waste contains ruminant feces.

5. The improvement of claim 4 wherein the ruminants are cattle.

6. The improvement of claim 1 wherein 50–70% by volume of the waste liquor output from the series of steps is recirculated and mixed with the incoming waste material to produce a waste liquor-impregnated waste material having a solids content ranging from about 2 to about 50% by weight.

References Cited
UNITED STATES PATENTS

| | | | |
|---|---|---|---|
| 3,462,275 | 8/1969 | Bellamy | 99—9 |
| 1,938,647 | 12/1933 | Earp-Thomas | 195—33 X |
| 3,356,609 | 12/1967 | Bruemmer | 210—11 X |
| 3,718,582 | 2/1973 | Smith | 210—6 |

LIONEL M. SHAPIRO, Primary Examiner

U.S. Cl. X.R.

210—6; 426—56